(12) United States Patent
Nagarajan et al.

(10) Patent No.: US 10,033,539 B1
(45) Date of Patent: Jul. 24, 2018

(54) REPLICATING MULTICAST STATE INFORMATION BETWEEN MULTI-HOMED EVPN ROUTING DEVICES

(71) Applicant: Juniper Networks, Inc., Sunnyvale, CA (US)

(72) Inventors: Vikram Nagarajan, Chennai (IN); Sachin S. Natu, Fremont, CA (US); Kapil Arora, Bangalore (IN); Sunil Kumar Malali, Bangalore (IN); Goutham Patil R, Bangalore (IN); Raj Chetan Boddireddy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 15/087,757

(22) Filed: Mar. 31, 2016

(51) Int. Cl.
*H04L 12/18* (2006.01)
*H04L 12/46* (2006.01)
*H04L 29/12* (2006.01)
*H04L 12/24* (2006.01)

(52) U.S. Cl.
CPC ........ *H04L 12/185* (2013.01); *H04L 12/4641* (2013.01); *H04L 41/0213* (2013.01); *H04L 61/6077* (2013.01)

(58) Field of Classification Search
CPC ............... H04L 12/185; H04L 12/4641; H04L 41/0213; H04L 61/6077
See application file for complete search history.

(56) References Cited

U.S. PATENT DOCUMENTS

| 8,837,479 B1 * | 9/2014 | Kumar ................ H04L 12/1877 370/228 |
| 8,934,486 B2 * | 1/2015 | Wijnands ............ H04L 12/1836 370/390 |
| 9,628,409 B1 * | 4/2017 | Yuvaraj ................ H04L 49/201 |

(Continued)

FOREIGN PATENT DOCUMENTS

| EP | 3188409 A1 * | 7/2017 | .......... H04L 43/0811 |
| EP | 3188415 A1 * | 7/2017 | .......... H04L 12/4625 |

OTHER PUBLICATIONS

Fenner, "Internet Group Management Protocol,Version 2," RFC 2236, Network Working Group, Nov. 1997, 24 pp.

(Continued)

*Primary Examiner* — Tri H Phan
(74) *Attorney, Agent, or Firm* — Shumaker & Sieffert, P.A.

(57) ABSTRACT

In one example, a first routing device of an Ethernet virtual private network (EVPN) is multihomed to a customer edge (CE) routing device with a second routing device. The first routing device includes one or more network interfaces configured to send and receive packets. The first routing device also includes one or more processors configured to receive, via the one or more network interfaces, a first packet from the CE routing device including multicast join information, update multicast state information of the first routing device using the multicast join information from the first packet, and send, via the one or more network interfaces, a second packet including data representative of the multicast join information to the second routing device to synchronize multicast state information of the second routing device with the multicast state information of the first routing device.

28 Claims, 4 Drawing Sheets

(56) References Cited

U.S. PATENT DOCUMENTS

| | | | | |
|---|---|---|---|---|
| 2007/0217415 A1* | 9/2007 | Wijnands | ............ | H04L 12/1836 370/390 |
| 2010/0177752 A1* | 7/2010 | Aggarwal | ............... | H04L 45/50 370/338 |
| 2013/0094505 A1* | 4/2013 | Sarikaya | ............... | H04L 12/184 370/390 |
| 2013/0148657 A1* | 6/2013 | Salam | ..................... | H04L 45/66 370/390 |
| 2014/0226531 A1* | 8/2014 | Farkas | ................. | H04L 41/0893 370/256 |
| 2015/0006757 A1* | 1/2015 | Boutros | .................. | H04L 45/14 709/242 |
| 2015/0288540 A1* | 10/2015 | Kotalwar | ............ | H04L 12/4679 370/254 |
| 2016/0119156 A1* | 4/2016 | Drake | ..................... | H04L 45/16 709/223 |
| 2016/0134525 A1* | 5/2016 | Zhang | ................. | H04L 12/6418 370/392 |
| 2016/0277210 A1* | 9/2016 | Lin | ...................... | H04L 12/4625 |
| 2017/0093611 A1* | 3/2017 | Arora | .................. | H04L 41/0654 |
| 2017/0195210 A1* | 7/2017 | Jacob | .................. | H04L 12/4625 |
| 2017/0257311 A1* | 9/2017 | Sharma | ............... | H04L 12/4641 |

OTHER PUBLICATIONS

Cain et al., "Internet Group Management Protocol, Version 3," RFC 3376, Network Working Group, Oct. 2002, 53 pp.

Holbrook et al., "Using Internet Group Management Protocol Version 3 (IGMPv3) and Multicast Listener Discovery Protocol Version 2 (MLDv2) for Source-Specific Multicast," RFC 4604, Network Working Group, Aug. 2006, 11 pp.

Sajassi et al., "BGP MPLS-Based Ethernet VPN," RFC 7432, Internet Engineering Task Force (IETF), Feb. 2015, 56 pp.

Sajassi et al., "BGP MPLS Based Ethernet VPN," Network Working Group Internet Draft, draft-ieff-I2vpn-evpn-11, Oct. 18, 2014, 52 pp.

\* cited by examiner

REPLICATING MULTICAST STATE INFORMATION BETWEEN MULTI-HOMED EVPN ROUTING DEVICES

TECHNICAL FIELD

This disclosure relates to computer networks, and more particularly, to Ethernet Virtual Private Networks (EVPNs).

BACKGROUND

A computer network is a collection of interconnected computing devices that can exchange data and share resources. Example network devices include layer two devices (e.g., switches) that operate within the second layer (L2) of the Open Systems Interconnection (OSI) reference model, i.e., the data link layer, and layer three devices (e.g., routers) that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE (generic routing encapsulation) tunneling or other IP tunneling can be used between the network devices.

As the PE network devices in an EVPN forward Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In a conventional L2 switching environment, various types of traffic are typically forwarded on all interfaces of an L2 device, such as a switch. For example, a network packet that is a broadcast packet, an unknown unicast packet or a multicast packet (generally referred to as "BUM" traffic) is typically forwarded on all interfaces of a switch. As one example, assume such a switch was not configured with Internet Group Management Protocol (IGMP) snooping, and it receives a multicast listener interest message (such as an IGMP Report) from a downstream device. When multicast data traffic arrives from a multicast source, the switch would forward the multicast traffic via all interfaces other than the interface from which the multicast traffic was received. This would be the case even if there were no interested listeners for the traffic on such interfaces. This is undesirable, because the multicast traffic would consume bandwidth on links coupled to such interfaces, without reaching any devices that were configured to receive the multicast traffic.

IGMP snooping allows a switch to determine which interfaces by which to send received multicast traffic. In particular, when an IGMP Report/Join is received, an IGMP-enabled switch detects that the packet is an IGMP Report (i.e., "snoops" the packet) and updates internal data indicating that corresponding multicast traffic has been requested by a device on a certain interface and, therefore, when received is to be forwarded via the interface from which the IGMP Report was received. Thus, when multicast traffic is received, an IGMP-enabled switch would only forward the traffic via the particular interface(s) that lead to devices that have requested the particular multicast traffic. Likewise, if the switch did not receive any IGMP Reports, but received multicast traffic, and the switch was configured to perform IGMP snooping, the switch would not forward the multicast traffic at all, but instead, simply drop the multicast traffic. Of course, the switch would continue to forward Broadcast or Unknown Unicast traffic to all downstream links.

SUMMARY

In general, this disclosure describes techniques for replicating multicast state information between multi-homed Ethernet Virtual Private Network (EVPN) routing devices. EVPN effectively allows a Layer 3 (L3) device, such as a router, to act as a switch for the purpose of forwarding VPN traffic. Such a router may be configured to perform multicast snooping, such as IGMP snooping, when performing L2 forwarding operations associated with the EVPN. Accordingly, when a router is configured to perform multicast snooping, the router forwards multicast traffic received from a core network only via local interfaces from which a multicast join request (such as an IGMP report) has been received. Moreover, in the event the routers are multi-homed to a common customer network via an Ethernet segment, the routers synchronize multicast state information between each other in accordance with the techniques of this disclosure. In this manner, if one of the routers receives a multicast join request from the customer network, but another of the routers is a designated forwarder (DF) for the EVPN, the DF will receive multicast state information synchronized with the router that received the multicast join request, and consequently, correctly forward received multicast traffic from the core network to the customer network via the Ethernet segment such that the customer device that sent the multicast join request will receive the multicast traffic.

In one example, a method includes receiving, by a first routing device of an Ethernet virtual private network (EVPN) that is multihomed to a customer edge (CE) routing device with a second routing device, a first packet from the CE routing device including multicast join information. The method also includes updating, by the first routing device, multicast state information of the first routing device using the multicast join information from the first packet. The method further includes sending, by the first routing device, a second packet including data representative of the multicast join information to the second routing device to synchronize multicast state information of the second routing device with the multicast state information of the first routing device.

Another example is directed to a first routing device of an Ethernet virtual private network (EVPN) that is multihomed to a customer edge (CE) routing device with a second routing device. The first routing device includes one or more network interfaces configured to send and receive packets. The first routing device also includes one or more processors configured to receive, via the one or more network interfaces, a first packet from the CE routing device including multicast join information, update multicast state information of the first routing device using the multicast join information from the first packet, and send, via the one or more network interfaces, a second packet including data representative of the multicast join information to the second routing device to synchronize multicast state information of the second routing device with the multicast state information of the first routing device.

In another example, a computer-readable medium, such as a non-transitory computer-readable storage medium, has stored thereon instructions that, when executed, cause a processor of a first routing device of an Ethernet virtual private network (EVPN) that is multihomed to a customer edge (CE) routing device with a second routing device to receive a first packet from the CE routing device including multicast join information, update multicast state information of the first routing device using the multicast join information from the first packet, and send a second packet including data representative of the multicast join information to the second routing device to synchronize multicast state information of the second routing device with the multicast state information of the first routing device.

In another example, a system includes a plurality of routing devices of an Ethernet virtual private network (EVPN), wherein the plurality of routing devices are multihomed to a customer edge (CE) routing device, and wherein the plurality of routing devices include a first routing device and a second routing device. The first routing device is configured to receive a first packet from the CE routing device including multicast join information, update multicast state information of the first routing device using the multicast join information from the first packet, and send a second packet including data representative of the multicast join information to the second routing device to synchronize multicast state information of the second routing device with the multicast state information of the first routing device. The second routing device is configured to receive the second packet, and update the multicast state information of the second routing device using the data representative of the multicast join information.

The details of one or more examples are set forth in the accompanying drawings and the description below. Other features, objects, and advantages will be apparent from the description and drawings, and from the claims.

DETAILED DESCRIPTION

Figure 1:
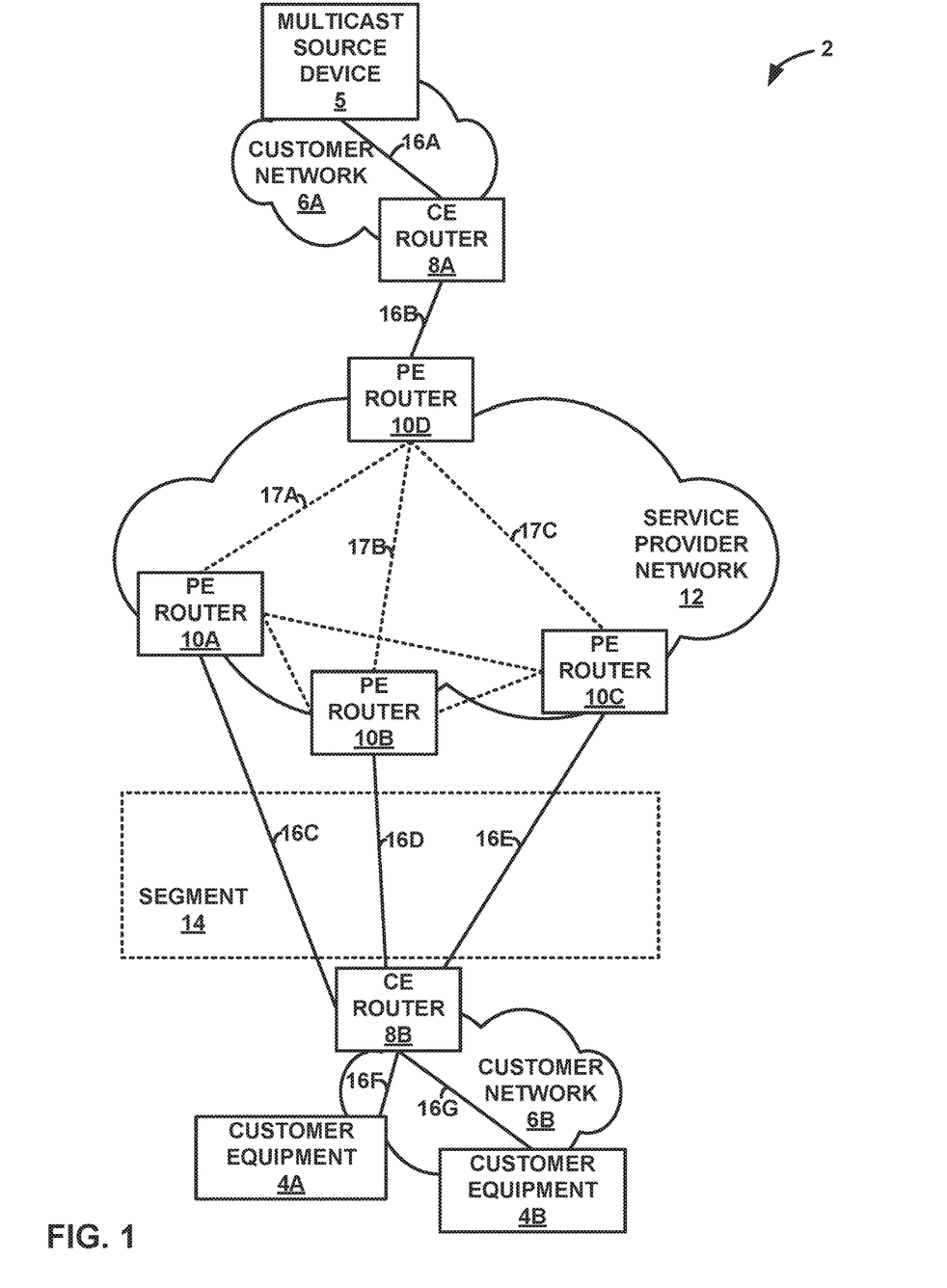
FIG. 1 is a block diagram illustrating an example network including provider edge (PE) routers configured according to the techniques of this disclosure.

FIG. 1 is a block diagram illustrating an example network 2 including provider edge (PE) routers 10A-10D configured according to the techniques of this disclosure. In the example of FIG. 1, PE routers 10A-10D ("PE routers 10") provide multicast source device 5 and customer equipment 4A and 4B ("customer equipment 4") associated with customer networks 6A-6B ("customer networks 6"), respectively, with access to service provider network 12 via CE routers 8A-8B ("CE routers 8"). Network links 16A-16G may be Ethernet, ATM, or any other suitable network connections.

PE routers 8 and CE routers 10 are illustrated as routers in the example of FIG. 1. However, techniques of the disclosure may be implemented using switches or other suitable network devices that participate in a layer two (L2) virtual private network service, such as an Ethernet Virtual Private Network (EVPN). EVPNs are described in Sajassi et al., "BGP MPLS-Based Ethernet VPN," Internet Engineering Task Force, RFC 7432, February 2015, available at tools.ietf.org/html/rfc7432, incorporated herein by reference. Customer networks 6 may be networks for geographically separated sites of an enterprise. Each of customer networks 6 may include additional customer equipment, such as one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely one example. In general, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually a large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as PE routers 10A-10D. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag>combination. This label assignment methodology is referred to as a per <ESI, Ethernet Tag>label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment. From the perspective of PE routers 10A-10C, network links 16C-16E represent Ethernet segment 14, whereas from the perspective of CE router 8B, network links 16C-16E may represent an Aggregated Ethernet (AE) bundle.

In the example of FIG. 1, for use in transporting communications associated with one or more EVIs, the network operator configures PE routers 10 to provision pseudowires 17A-17C for transporting L2 communications. Pseudowires are logical network connections formed from two unidirectional label switched paths (LSPs) that emulate an L2 connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6. As such, each EVPN instance may operate over pseudowires 17 to enable a logical form of L2 connectivity between customer networks 6.

To configure an EVI, pseudowires 17 may be configured within service provider network 12 such that each of PE routers 10 that provide a given EVI is interconnected by way of pseudowires to every other one of the PE devices participating in the EVI. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires 17. Once pseudowires are configured within service provider network 12 in this manner, EVPN may be enabled within PE devices 10 to operate over the pseudowires, which may in this context operate as logical dedicated links through service provider network 12. In operation, EVPN generally involves prepending or otherwise inserting a tag and a pseudowire label onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In order to establish the EVPN, an EVPN protocol executing on PE routers 10A-10C triggers an EVPN designated forwarder (DF) election for forwarding traffic from service provider network 12 to customer network 6B via Ethernet segment 14. This may be accomplished, for example, by EVPN protocol executing on each of PE routers 10A-10C that participate in the Ethernet segment and directing the router to output a routing protocol message advertising an Ethernet Segment Identifier (ESI), which is typically unique across all EVPN instances (EVIs). In addition, for each EVI, the EVPN protocol directs the router to output a routing protocol message advertising an Ethernet Auto-Discovery (AD) route specifying the relevant ESI for the Ethernet segment coupled to the EVPN instance. Once the EVPN is operational for the {EVI, ESI} pair, PE routers 10A-10C output routing protocol messages to remote PE router 10D to announce media access control (MAC) addresses associated with customer equipment in customer network 6B as the MAC addresses are learned when forwarding traffic received from the customer equipment.

For example, in typical operation, PE routers 10A-10D communicate using the Border Gateway Protocol (BGP) and the EVPN protocol specifies BGP Network Layer Reachability Information (NLRI) for the EVPN and may define different route types for conveying EVPN information via the BGP routing protocol. The EVPN NLRI is typically carried in BGP using BGP Multiprotocol Extensions. An Ethernet Segment route advertised by each PE router 10A-10C using BGP includes a Route Distinguisher and Ethernet Segment Identifier. An Ethernet AD route advertised by each PE router 10A-10C for each EVI, specifies a Route Distinguisher (RD) (e.g., an IP address of an MPLS Edge Switch (IVIES)), ESI, Ethernet Tag Identifier, and MPLS label. Subsequent BGP media access control (MAC) routes output by PE router 10A-10C announce MAC addresses of customer equipment 4 for the EVPN include a RD, ESI, Ethernet Tag Identifier, MAC address and MAC address length, IP address and IP address length, and MPLS label.

As such, the EVPN protocol executing on each PE router 10A-10C initiates EVPN DF election for the Ethernet segment on a per EVPN instance basis, and participates within that election for each EVPN instance. That is, DF election may be at the granularity of each {ESI, EVI} combination. If elected DF, one of PE routers 10A-10C elected as DF forwards any BUM traffic from the EVPN to local CE router 8B. Additional example information with respect to the EVPN protocol is described in "BGP MPLS Based Ethernet VPN," draft-ietf-l2vpn-evpn-11, Internet Engineering Task Force (IETF), Jul. 2, 2014, the entire contents of which are incorporated herein by reference.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including MAC addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10D) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8B is coupled to PE routers 10A, 10B, 10C via links 16C, 16D, and 16E, respectively, where PE routers 10A, 10B, and 10C are capable of providing access to EVPN for L2 customer network 6B via CE router 8B. In instances where a given customer network (such as customer network 6B) may couple to service provider network 12 via two different and, to a certain extent, redundant links, the customer network may be referred to as being "multi-homed." In this example, CE router 8B is multi-homed to PE routers 10A, 10B, and 10C since CE router 8B is coupled to three different PE routers 10A, 10B, and 10C via separate and, to a certain extent, redundant links 16C, 16D, and 16E, where both of PE routers 10A, 10B, and 10C are capable of providing access to EVPN for L2 customer network 6B. Multi-homed networks are often employed by network operators so as to improve access to EVPN provided by service provider network 12 should a failure in one of links 16C, 16D, and 16E occur.

In the example of FIG. 1, multicast source device 5 provides multicast content to requesting devices. For example, customer equipment 4A may submit a request to multicast source device 5 to join a multicast group. The request may, for example, conform to an Internet Group Management Protocol (IGMP) report, a Protocol Independent Multicast (PIM) request, or other such request for joining a multicast group. The request will be generally referred to as a multicast join request below. In one example, customer equipment 4A sends the multicast join request to CE router 8B, which forwards the request along one of network links 16C-16E of Ethernet segment 14 to one of PE routers 10A-10C, such as by applying a hash function to select one of the links. Assume without loss of generality that CE router 8B forwards the multicast join request to PE router 10A.

In accordance with the techniques of this disclosure, upon receiving the multicast join, PE router 10A inspects data within the multicast join request and updates local multicast state information associated with a multicast group corresponding to the multicast join request, thereby "snooping" on the join request. In this manner, when PE router 10A is acting as the designated forwarder (DF), PE router 10A will forward traffic of the multicast group from the EVPN of service provider network 12 to CE router 8B via Ethernet segment 14, without forwarding the traffic of the multicast group to other network devices to which PE router 10A is communicatively coupled. On the other hand, when PE router 10A is not acting as the DF, PE router 10A may simply disregard traffic of the multicast group (e.g., avoid forwarding the traffic). In such a case, another one of PE routers 10B and 10C (e.g., PE router 10B) will be configured as the DF.

Conventionally, if PE router 10A were to receive the multicast join request and PE router 10B was configured as the DF (and thus, PE router 10A was configured as a non-designated forwarder (non-DF)), PE router 10B would not have received the multicast state information that PE router 10A received. Therefore, upon receiving multicast traffic from the EVPN of service provider network 12, PE router 10B would either flood the multicast traffic to all downstream devices (including CE router 8B), or if IGMP snooping were enabled, PE router 10B would not forward the multicast traffic to any downstream devices. Flooding the multicast traffic to all downstream devices is undesirable because it consumes tremendous amounts of network resources. Not forwarding the multicast traffic at all is even less desirable, however, because customer equipment 4A will not receive the requested multicast traffic in such a case.

In accordance with the techniques of this disclosure, when PE router 10A receives a multicast join request and is configured as a non-DF, in addition to forwarding the multicast join request toward the multicast source by way of the EVPN, PE router 10A generates and outputs information of the multicast join request to other PE routers (in this example, PE routers 10B and 10C) in the same EVI, to cause the other PE routers to update multicast state information. For example, PE router 10A may initially snoop on the multicast join by processing the multicast join request to extract information representative of the multicast group and the downstream device to which multicast traffic of the multicast group is to be forwarded (in this example, customer equipment 4A), forward the multicast join toward multicast source device 5, and forward a copy of the received multicast join request to PE routers 10B and 10C. Alternatively, PE router 10A may initially process the multicast join request to extract information representative of the multicast group and the downstream device to which multicast traffic of the multicast group is to be forwarded (in this example, customer equipment 4A), and then send the information representative of the multicast group and the downstream device to PE routers 10B and 10C.

In this manner, in the event PE router 10B (configured as DF in this example) receives the multicast traffic of the multicast group, PE router 10B, using the multicast state information, is able to determine that the multicast traffic is to be forwarded to customer equipment 4A via Ethernet segment 14 without broadcasting the multicast traffic out all of its other interfaces. Thus, although CE router 8B sent the multicast join request to PE router 10A (e.g., by using hashing or other load balancing techniques with respect to Ethernet segment 14), PE router 10B nevertheless can determine that multicast traffic of a particular multicast group corresponding to the multicast join request is to be forwarded to CE router 8B via the particular interface coupling PE router 10B to Ethernet segment 14, to ultimately reach customer equipment 4A without needed to broadcast the multicast traffic.

As such, each of PE routers 10A-10C participating in Ethernet segment 16 may update and synchronize multicast state information in this manner. Thus, assuming again that PE router 10B were originally configured as DF, either of PE routers 10A or 10C may later be elected as DF and forward the multicast traffic of the multicast group using the multicast state information.

To further illustrate the example, with respect to the topology of FIG. 1, assume PE router 10A and PE router 10B are multihomed to CE router 8B and are configured to perform IGMP snooping on the access side (that is, on network links 16C-16E). CE router 8B receives an IGMP report from customer equipment 4A. CE router 8B sends the IGMP report towards CE router 8A and multicast source device 5. CE router 8B is connected to PE Router 10A and PE Router 10B over an aggregated interface formed by network links 16C-16E. By virtue of the aggregated interface, it can so happen that the IGMP report/Join packet gets hashed based on a standard network tuple, and CE router 8B sends the report only on one of network links 16C-16E of the ae, say, network link 16C. Only PE router 10A, therefore, would receive the IGMP report, and thus, PE router 10A creates the IGMP snooping state. Four situations are possible, in this example: 1) PE router 10A is DF, 2) PE router 10A is non-DF, 3) PE router 10A changes from DF to non-DF, 4) PE router 10A changes from non-DF to DF.

In the first situation noted above in which PE router 10A is DF, PE router 10A will send received IGMP reports to PE router 10D, to ultimately reach multicast source device 5. In accordance with the techniques of this disclosure, PE router 10A also sends multicast state information to PE routers 10B and 10C. PE router 10D receives the IGMP report and forwards the IGMP report to CE router 10A, which forwards the IGMP report to multicast source device 5. CE router 10A further receives multicast traffic from multicast source device 5 and forwards the multicast traffic to PE router 10D as multicast BUM (Broadcast/Unknown Unicast/Multicast) traffic. In response to such traffic, PE router 10D forwards the multicast traffic through the core network, i.e., service provider network 12. PE routers 10A-10C receive the traffic over psuedowires 17, which may also be referred to as Ingress Replication (IR) tunnels. PE routers 10B and 10C, which in this case are non-DFs, drop the packets coming from the core (service provider network 12). Since PE router 10A is DF in this example, PE router 10A forwards the multicast traffic to CE router 8B, which will forward the traffic to customer equipment 4A. The third situation (i.e., where PE router 10A starts as a non-DF and becomes DF) is similar to this first situation, and therefore is not discussed further.

In the second situation noted above in which PE router 10A is non-DF (assuming PE router 10B is DF), PE router 10A sends the received IGMP report to PE router 10D as regular BUM traffic over Inclusive Multicast (IM), such as IR tunnels, towards PE router 10D. In this scenario, PE router 10A would typically send a copy of the packet toward PE router 10B according to standard L2 forwarding operations by, for example, appending a Split Horizon Label and an IR label to a copy of the packet and forwarding the copy to PE router 10B, in accordance with RFC 7432. However, rather than simply appending the Split Horizon Label to the copy of the packet before forwarding the copy to PE router 10B, in accordance with the techniques of this disclosure, PE router 10A uses a unique IGMP label to indicate the packet contains multicast state information, thus causing PE routers 10B and 10C to update multicast state information based on the IGMP report contained therein. PE router 10D receives the IGMP report and forwards the IGMP report to CE router 10A, which forwards the IGMP report to multicast source device 5. CE router 10A further pulls multicast traffic from multicast source device 5 (e.g., using Protocol Independent Multicast (PIM)) and forwards the multicast traffic to PE router 10D as multicast BUM traffic. In response to such traffic, PE router 10D forwards the multicast traffic through the core network, i.e., service provider network 12. In this example, since PE router 10A is configured as non-DF, PE router 10A drops any BUM packets received from the core (i.e., service provider network 12). As noted above, PE router 10B will have updated multicast state information, and therefore, as DF in this example, forwards the received multicast traffic to CE router 8B. The fourth situation (i.e., where PE router 10A starts as DF and becomes non-DF) is similar to this second situation, and therefore is not discussed further.

In this manner, the techniques of this disclosure may address problems that may arise when PE routers 10A-10C are multi-homed to CE router 8B and are configured to perform IGMP snooping. That is, conventionally in such an arrangement, if a non-DF PE router received an IGMP Report, the DF PE router would likely not forward multicast traffic associated with the IGMP Report. However, because PE routers 10A-10C are configured to synchronize multicast state information, the DF PE router (e.g., PE router 10B) that receives multicast traffic will properly forward the multicast traffic according to an IGMP report, even though the DF PE router did not receive the IGMP report (instead, PE router 10A received the IGMP report, in this example).

Furthermore, the techniques of this disclosure may address this problem, without resorting to a special case of, e.g., a non-DF being configured to forward multicast traffic if IGMP snooping is enabled. These techniques may be advantageous over such a special case, because the special case would not be made generic on the PEs. That is, if CE router 8B were instead connected to PE routers 10A-10C over non-AE interfaces (e.g., over two individual ge interfaces), then CE router 8B would send the IGMP reports to each of PE routers 10A-10C. Thus, the DF and non-DFs would each forward traffic based on the IGMP states created, which would result in duplicates, which is undesirable for customer equipment 4A.

PE routers 10A-10C may also be configured to synchronize multicast state information in response to receiving an IGMP Leave (or other multicast leave information). In this manner, PE routers 10A-10C correctly address the scenario in which an IGMP Report and IGMP Leave for the same multicast source and group are sent on different member link interfaces of an aggregated interface bundle (e.g., network links 16C-16E). Per section 9 of IGMP RFC 2236, an IGMP Report includes data defining a destination as a multicast group being reported, while the IGMP Leave message includes data defining a destination as ALL-ROUTERS (224.0.0.2). So, if a host (e.g., customer equipment 4A) joins a multicast group and after some time, leaves the group, the following may be performed.

In an aggregated interface environment, it can happen that CE router 8B sends an IGMP Report to PE router 10A, but sends a subsequent IGMP Leave to PE router 10B. This may occur by virtue of destination IP addresses and MACs being different, resulting in different tuples in packet headers. PE routers 10A and 10B, according to the techniques of this disclosure, exchange multicast state information between each other and PE router 10C. In this manner, the DF (e.g., PE router 10A) will not send multicast traffic to a host (e.g., customer equipment 4A) following an IGMP Leave, even though PE router 10A did not receive the IGMP Leave from customer equipment 4A via CE router 8B.

Although three multi-homed PE routers 10A-10C are shown in FIG. 1 for purposes of example, it should be understood that these techniques may be applied to any number of multi-homed PE routers in an ESI. Thus, any of the routers of an ESI may receive an IGMP Report and send data representing IGMP state update information to each of the other routers of the ESI.

The multicast state synchronization information may be distributed among PE routers 10A-10C using a distinct IGMP label. An example of such an IGMP label is discussed below with respect to FIG. 3. In general, the IGMP label may encapsulate a packet including IGMP state information, and indicates to a receiving device (e.g., one of PE routers 10A-10C) that a packet encapsulated by the IGMP label is to be passed up to the control plane and processed by the control plane to update IGMP state information.

The techniques of this disclosure may achieve one or more advantages. For example, the techniques of this disclosure provide separate semantics for handling IGMP snooping information between multi-homed PEs, such as PE routers 10A-10C. Although IGMP is discussed for purposes of example, other multicast techniques may also be used, such as PIM. An IGMP labeled packet may be used specifically for IGMP, while other categories of BUM traffic can be processed as usual, without changes. The techniques of this disclosure are also fairly straightforward to implement. That is, only control plane changes are needed. In particular, the sender already has the state information per conventional IGMP snooping techniques. The receiver can perform a label lookup on the IGMP label and then pass a packet encapsulated by the IGMP label to an IGMP module or processing unit in the control plane for direct processing.

Figure 2:
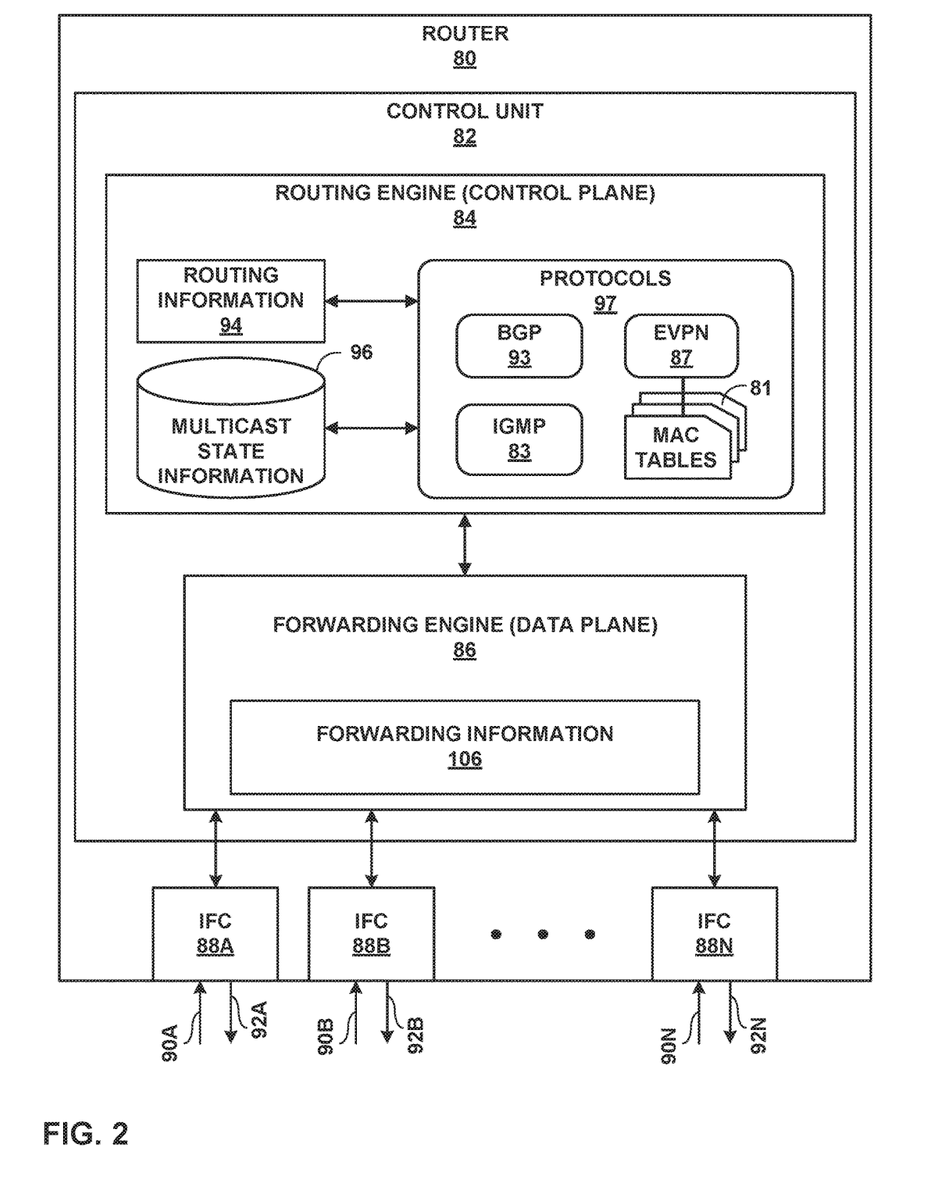
FIG. 2 is a block diagram illustrating an example router configured to perform the techniques of this disclosure.

FIG. 2 is a block diagram illustrating an example router 80 configured to perform the techniques of this disclosure. In general, router 80 may operate substantially similarly to PEs 10 of FIG. 1.

In this example, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

In this example, control unit 82 includes a routing engine 84 and a packet forwarding engine 86. Routing engine 84 operates as the control plane for router 80 and includes an operating system that provides a multi-tasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99, for exchanging routing information with other routing devices and for updating routing information 94. Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In addition, routing engine 84 executes EVPN protocol 87, which operates to communicate with other routers to establish and maintain an EVPN, such as the EVPN of FIG. 1, for transporting L2 communications through an intermediate network so as to logically extend an Ethernet network through the intermediate network. EVPN protocol 87 may, for example, communicate with EVPN protocols executing on remote routers to establish pseudowires for the EVPN and maintain MAC address tables 50 associating L2 customer MAC addresses with specific pseudowires. When implementing an EVPN, L2 MAC learning may be performed in the control plane by exchanging, with remote PE devices, BGP messages containing customer MAC addresses. EVPN protocol 87 communicates information recorded in MAC tables 81 to forwarding engine 86 so as to configure forwarding information 56. In this way, forwarding engine 30A may be programmed with associations between each PW and output interface and specific source customer MAC addresses reachable via those PWs. Additional example information with respect to the EVPN protocol is described in "BGP MPLS Based Ethernet VPN," draft-ietf-12vpn-evpn-11, Internet Engineering Task Force (IETF), Jul. 2, 2014, the entire contents of which are incorporated herein by reference.

In some examples, BGP 93 and EVPN 87 advertise and/or receive Ethernet A-D per EVI routes that have been enhanced to carry the EVPN MH PE Status extended community data structure described herein. That is, in response to instructions from EVPN protocol 87, BGP protocol 93 generates for output BGP Ethernet A-D per EVI routes specifying primary PE DF and backup DF for each {ESI, EVI}. Moreover, BGP 93 may similarly be configured to receive BGP Ethernet A-D per EVI routes specifying such information, and may extract such information and convey the elections to EVPN 87.

Routing engine 84 also executes IGMP 83, in one example, to inspect multicast join requests (e.g., IGMP reports) from client devices (such as customer equipment 4A). That is, forwarding engine 86 is configured to "snoop" when forwarding packet in the data plane so as to identify any IGMP packets. Upon detecting an IGMP packet, such as an IGMP join, forwarding engine redirects the IGMP packet to IGMP 83 executing in routing engine 84 for processing as described herein. For purposes of explanation, the description of router 80 describes IGMP as an example. However, other multicast protocols, such as PIM, may be used in other examples. In this example, routing engine 84 executes IGMP 83 to retrieve multicast state information from an IGMP report packet received from forwarding engine 86. Routing engine 84 also updates multicast state information 96 using the retrieved multicast state information. In general, multicast state information 96 represents information for forwarding multicast traffic, such as a mapping from a multicast group address and an identifier for a source of the multicast to identifiers for receivers of the traffic (e.g., IP addresses and/or MAC addresses).

In addition to forwarding the original multicast report toward the multicast source, IGMP 83 generates a multicast state update message for one or more other routers in a common EVI with router 80. In one example, routing engine 84 executes IGMP 83 to construct a packet including a copy of the multicast join request, encapsulated with an IGMP label described herein. In another example, routing engine 84 constructs a packet that includes information based on the multicast join request (but not the multicast join request itself), encapsulated with the IGMP label. In general, the IGMP label has a value that indicates that a packet encapsulated with the IGMP label includes multicast state update information. Routers, such as router 80, may initially exchange a value for the IGMP label and negotiate that the value is associated with multicast state update information. Additionally, routing engine 84 executes IGMP 83 to process multicast state information received from another routing device in a common EVI with router 80 encapsulated with the IGMP label. In response to receiving such a packet encapsulated with the IGMP label, as redirected from forwarding engine 86, routing engine 84 updates multicast state information 96 with multicast state information from the packet.

Using multicast state information 96, routing engine 84 programs forwarding information 106. In this manner, when router 80 is configured as DF, and one of IFCs 88 receives a packet including multicast traffic, forwarding engine 86 determines a source of the traffic (e.g., based on the one of IFCs 88 that received the packet), a multicast group address (e.g., included in header information of the traffic) and, based on these values as indicated in forwarding information 106, which of IFCs 88 by which to forward the packet. If one of IFCs 88 receives a packet encapsulated with the IGMP label discussed above, forwarding engine 86 forwards the packet to routing engine 84, to be processed according to IGMP 83. If router 80 is configured as non-DF, router 80 may simply drop packets including multicast traffic.

The architecture of router 80 illustrated in FIG. 2 is shown for explanatory purposes. The techniques of this disclosure are not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk. When such functionality is implemented in software or firmware, it should be understood that control unit 82 would further include requisite hardware for executing instructions of the software or firmware. Such hardware may generally include one or more microprocessors, field programmable gate arrays (FPGAs), application specific integrated circuits (ASICs), digital signal processors (DSPs), or the like, and/or any combination thereof. In general, hardware for executing software includes digital logic circuitry.

Router 80, in this manner, represents an example of a first routing device of an Ethernet virtual private network (EVPN) that is multihomed to a customer edge (CE) routing device with a second routing device, the first routing device including one or more network interfaces configured to send and receive packets, and one or more processors configured to receive, via the one or more network interfaces, a first packet from the CE routing device including multicast join information, update multicast state information of the first routing device using the multicast join information from the first packet, and send, via the one or more network interfaces, a second packet including data representative of the multicast join information to the second routing device to synchronize multicast state information of the second routing device with the multicast state information of the first routing device.

Figure 3:
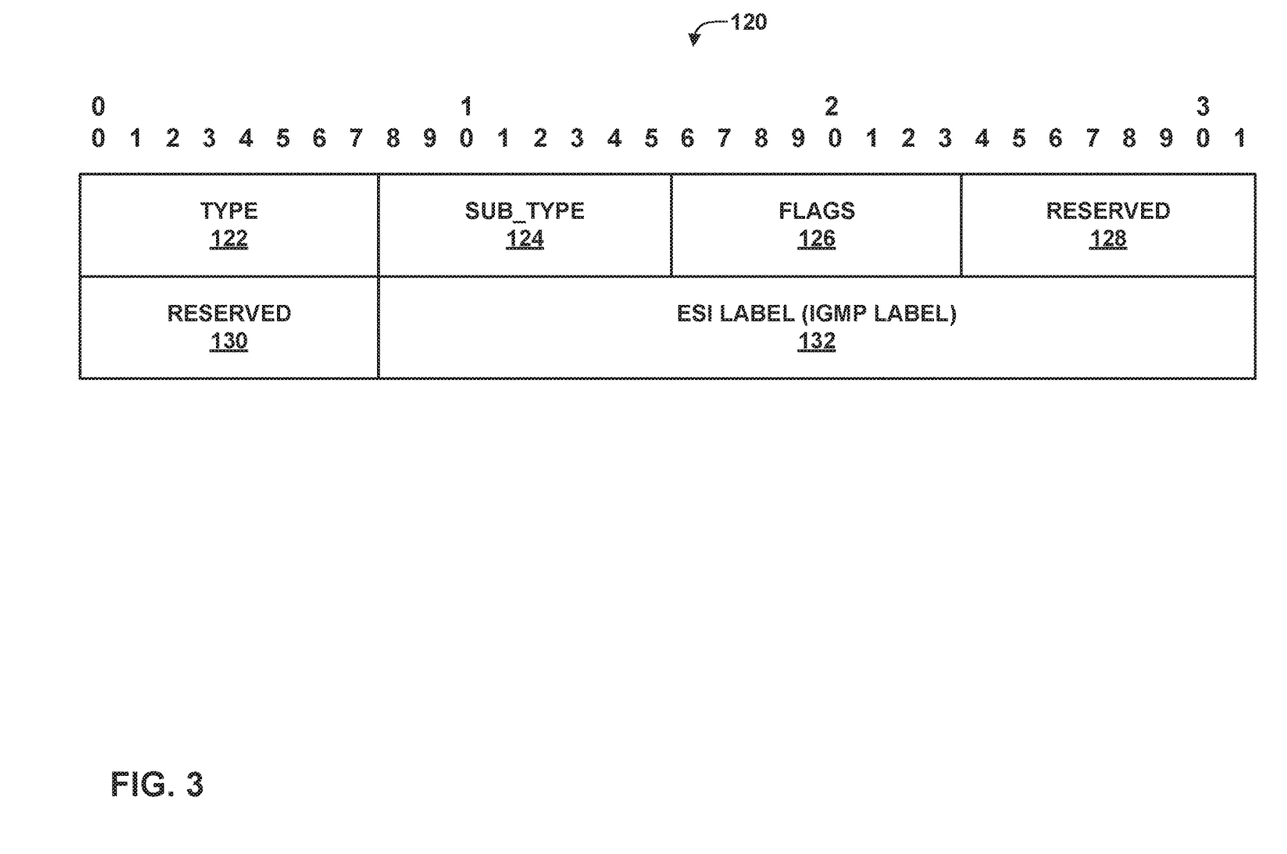
FIG. 3 is a block diagram illustrating an example Internet Group Management Protocol (IGMP) Label that may be used to identify a packet including IGMP data according to the techniques of this disclosure.

FIG. 3 is a block diagram illustrating an example IGMP label 120 that may be used to identify a packet including IGMP data according to the techniques of this disclosure. Using IGMP Labels similar to IGMP Label 120 may enhance EVPN Type-1 per ESI. Conventionally, a Type-1 ESI route carries an ESI value and a Split Horizon Label in a BGP extended community.

In accordance with examples of the techniques of this disclosure, PE routers 10A-10C advertise IGMP Label 120 in the Type-1 per ESI route. IGMP Label 120 may be advertised as an "ESI Label Extended Community," as defined in Section 7.5 of RFC 7432. This is in addition to the conventional Split Horizon Label community.

IGMP Label 120 represents an example of an ESI Label Extended Community used for IGMP that may be attached to a Type-1 per ESI route. In this example, IGMP Label 120 includes type field 122, sub type field 124, flags field 126, reserved fields 128 and 130 (which may actually represent a single field, in some examples), and ESI label (IGMP label) field 132.

A PE router, such as PE router 10A, assigns values to type field 122 and sub type field 124 to identify IGMP Label 120 as including ESI Label (IGMP label) 132. Flags field 126 includes one or more flags pertinent to IGMP per RFC 7432, such as a "single-active" bit. Reserved fields 128, 130 are reserved for future use in IGMP, and are set to a value of "0."

ESI label (IGMP label) 132 has a predefined value indicating that a packet encapsulated by label 132 includes IGMP (or other multicast) state information. That is, a DF router and non-DF routers of an ESI exchange the value of ESI label (IGMP label) 132. In this manner, when one of the routers of the ESI receives an IGMP Report or an IGMP Leave, the router will update its own IGMP state information, then distribute IGMP state update information as a packet encapsulated with a label corresponding to label 120 to the other routers of the ESI. In this manner, the routers of the ESI will synchronize IGMP states with each other, such that all multi-homed Pes of the ESI have consistent IGMP states.

In this manner, if a router, such as PE router 10A of FIG. 1, is non-DF and receives an IGMP Report from the access side (e.g., from CE router 8B), the IGMP Report will be received as a BUM packet. PE router 10A detects the IGMP Report by virtue of IGMP snooping performed on the access side. The "access side" refers to any network interface not communicatively coupled to devices of service provider network 12. Based on the IGMP Report, PE router 10A creates IGMP state information and updates local IGMP state data.

Rather than adding a Split Horizon label to the packet including the IGMP Report, as would conventionally be performed per RFC 7432, PE router 10A encapsulates a packet (either a copy of the packet including the IGMP Report or a separate packet including IGMP state update information) with label 120 (including ESI Label (IGMP label) 132). ESI Label (IGMP Label) 132 conveys to receivers (e.g., PE routers 10B and 10C) that the packet is used solely for consuming the IGMP Report (or other IGMP state update information of the packet), and to update local state information (e.g., create appropriate state information to be used to update the local state information). PE router 10A further encapsulates the packet with an IR label. In this manner, the packet includes both label 120 and an IR label.

Thus, PE router 10B (representing the DF in this example) will subsequently receive the packet encapsulated by label 120 and the IR label. PE router 10B will then pop the IR label and discover label 120 (including ESI label (IGMP label) 132), which was previously advertised by the Type-1 ESI route. Based on discovery of label 120, the data or forwarding plane (e.g., forwarding engine 86 in FIG. 2) of PE router 10B will pass the packet to the control plane (e.g., routing engine 84 in FIG. 2) to be processed by IGMP 83 (FIG. 2). PE router 10B determines the incoming interface to use for state creation from the ESI of the Type-1 route which matched ESI label (IGMP label) 132.

For example, suppose PE router 10B had an ESI-x, and advertised a value of "L100" as an IGMP label (that is, a value for ESI label (IGMP label) 132) to PE routers 10A and 10C. PE router 10B may subsequently receive a packet over an IR tunnel, PE router 10B would pop the IR label and discover label 120 including a value of "L100" for ESI label (IGMP label) 132 of a label 120 of the packet. In response, PE router 10B will determine that ESI-x is the corresponding ESI for this packet, and thus will extract state information from the packet and update its local state information for ESI-x.

This mechanism may also be used to synchronize IGMP states that are learned by each of PE routers 10A-10C. For example, when PE router 10B (again, representing the DF in this example) snoops an IGMP Report, PE router 10B will use the IGMP label advertised by the non-DF (e.g., PE router 10A) and send data of the IGMP Report to PE routers 10A and 10C, so that PE routers 10A and 10C also keep the state information synchronized.

BGP EVPN Type-1 Route encoding may be used to exchange IGMP Labels between multi-homed PE routers for a particular ESI.

Figure 4:
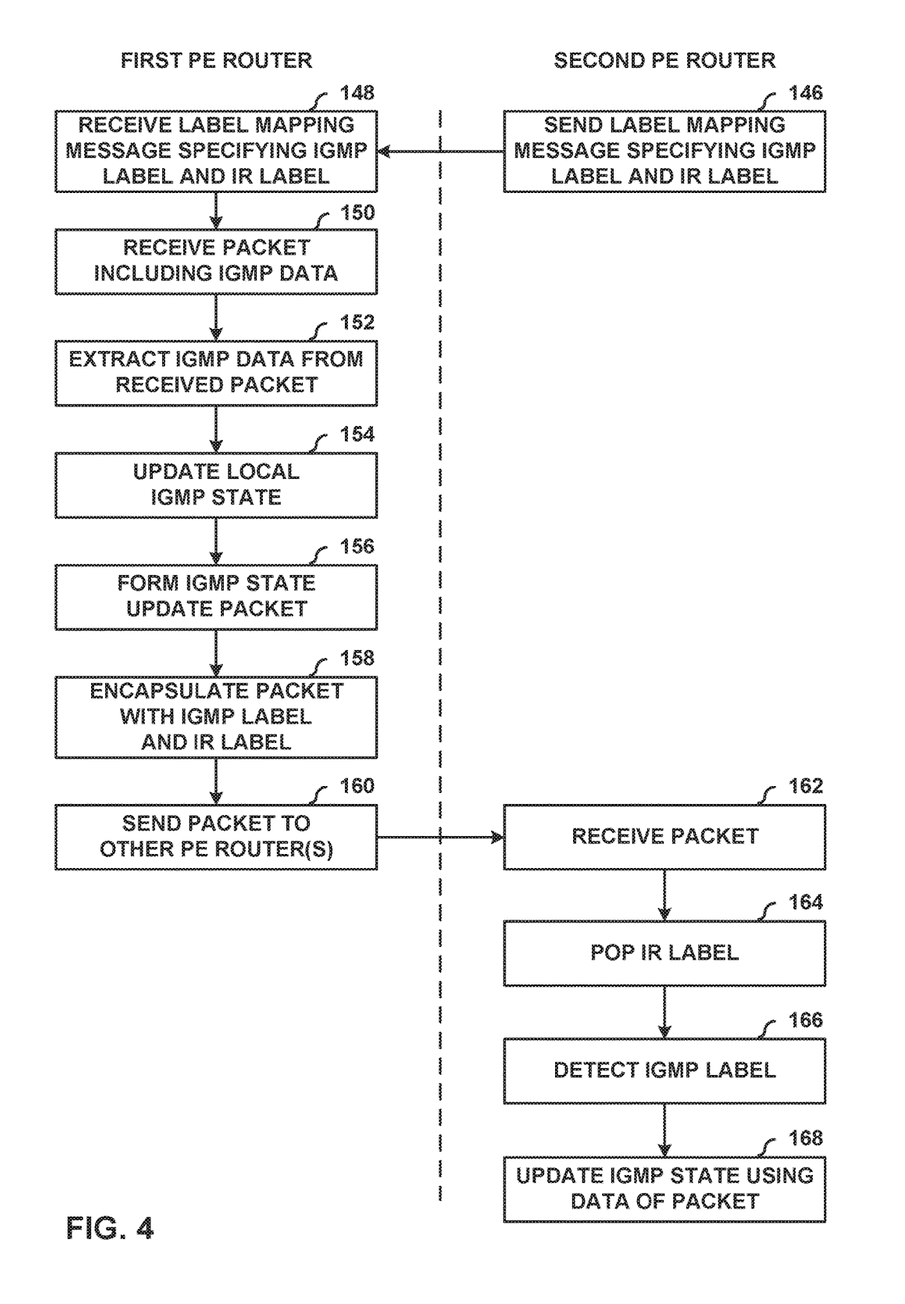
FIG. 4 is a flowchart illustrating an example method of performing the techniques of this disclosure.

FIG. 4 is a flowchart illustrating an example method of performing the techniques of this disclosure. The example method of FIG. 4 is explained as being performed by a first PE router (e.g., PE router 10A) and a second PE router (e.g., PE router 10B). However, it should be understood that any of a number of PE routers or other similar devices may be configured to perform this or a similar method.

Initially, PE router 10B sends a label mapping message specifying an IGMP label and an IR label to PE router 10A (146). PE router 10A receives the label mapping message specifying the IGMP label and the IR label (148), and stores the IGMP label and the IR label received from PE router 10B for subsequent messages, as discussed below.

PE router 10A subsequently receives a packet including IGMP data (150). That is, PE router 10A receives a packet from the access side (e.g., any network interface of PE router 10A that is not communicatively coupled to a device of service provider network 12). When performing forwarding/switching operations on the packet, PE router 10A further inspects the packet to perform IGMP snooping (or other multicast snooping, such as PIM snooping). In this example, PE router 10A determines, through the IGMP snooping that the packet includes IGMP data. For example, PE router 10A may determine that the packet includes an IGMP Report (or other multicast join request) or an IGMP Leave (or other multicast leave request).

PE router 10A extracts IGMP data from the received packet (152). For example, if the received packet includes an IGMP Report, PE router 10A may determine an identifier of a source of requested multicast traffic (e.g., an IP address of multicast source device 5), and a group address of the requested multicast traffic from the extracted IGMP data, as well as one of IFCs 88 corresponding to the requester of the multicast traffic (e.g., customer equipment 4A). Using this extracted data, PE router 10A updates local IGMP state information (154). For example, referring to the components shown in FIG. 2, forwarding engine 86 may pass the packet to routing engine 84, which executes IGMP 83 to extract the IGMP data and update multicast state information 96 with the extracted IGMP data. Furthermore, if PE router 10A is configured as DF, routing engine 84 programs forwarding information 106 to cause forwarding engine 86 to forward multicast traffic corresponding to the IGMP Report via a corresponding one of IFCs 88. On the other hand, if the received packet were an IGMP Leave and PE router 10A were DF, routing engine 84 would program forwarding information 106 to prevent the multicast traffic from being forwarded via the corresponding one of IFCs 88.

Furthermore, routing engine 84 executes IGMP 83 to form an IGMP state update packet (156). In some examples, the IGMP state update packet may simply be a copy of the IGMP Report or IGMP Leave, while in other examples, the IGMP state update packet may simply include information extracted from the IGMP Report or IGMP Leave (e.g., the address of the source, the multicast group address, and the address of the requesting device). Routing engine 84 further executes IGMP 83 to encapsulate the packet with an IGMP label (e.g., conforming to FIG. 3) and a transport label associated with the pseudowire(s) of the EVPN, such as an IR label (158). As discussed above, PE router 10A may initially receive an IGMP label and an IR label from PE router 10B in a label mapping message. Other units in the control plane may perform the encapsulations. For example, one or more specialized units, such as a tunnel Packet Interface Card (PIC), may be configured to encapsulate the packet with the labels.

In any case, after encapsulating the packet with the IGMP label and the IR label, PE router 10A forwards the packet to other PE routers of the same ESI (160), such as PE router 10B and PE router 10C. Thus, PE router 10B subsequently receives the packet (162). PE router 10B pops the IR label (164) and detects the IGMP label (166). That is, again referring to the components of FIG. 2, forwarding engine 86 removes the IR label, and detects the presence of the IGMP label. Forwarding engine 106 of PE router 10B may be programmed to cause forwarding engine 86 to forward packets encapsulated with the IGMP label to routing engine 84. Thus, routing engine 84 executes IGMP 83 to extract IGMP state information from the packet and to update IGMP state (e.g., multicast state information 96) using the data of the packet (168). Again, as explained above, if PE router 10B is configured as DF, PE router 10B may program routing information to cause multicast traffic corresponding to the IGMP data to be forwarded accordingly (e.g., to forward the multicast traffic if the IGMP data corresponds to an IGMP Report, or to prevent forwarding of the multicast traffic if the IGMP data corresponds to an IGMP Leave). If the data following the IR label had not been the IGMP label, PE router 10B would treat the packet as typical BUM traffic (e.g., by forwarding the packet or dropping the packet, based on whether PE router 10B were configured as DF or non-DF).

Either of PE routers 10A and 10B may be configured as the DF, and the other configured as non-DF, in this example. Alternatively, PE router 10C may be configured as the DF, and PE routers 10A and 10B may be configured as non-DFs in this example.

In this manner, the method of FIG. 4 represents an example of a method including receiving, by a first routing device of an Ethernet virtual private network (EVPN) that is multihomed to a customer edge (CE) routing device with a second routing device, a first packet from the CE routing device including multicast join information, updating, by the first routing device, multicast state information of the first routing device using the multicast join information from the first packet, and sending, by the first routing device, a second packet including data representative of the multicast join information to the second routing device to synchronize multicast state information of the second routing device with the multicast state information of the first routing device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   receiving, by a first routing device of an Ethernet virtual private network (EVPN) that is multihomed to a customer edge (CE) routing device with a second routing device such that the CE routing device is communicatively coupled to both the first routing device and the second routing device via a common Ethernet segment, a first packet from the CE routing device including multicast join information, wherein the CE routing device forms part of a customer network, and wherein the first routing device and the second routing device form part of a service provider network separate from the customer network;
   updating, by the first routing device, multicast state information of the first routing device using the multicast join information from the first packet; and
   sending, by the first routing device, a second packet including data representative of the multicast join information to the second routing device to synchronize multicast state information of the second routing device with the multicast state information of the first routing device.

2. The method of claim 1, wherein sending the second packet comprises encapsulating the first packet with a label to form the second packet, wherein the label indicates that the second packet includes the data representative of the multicast join information.

3. The method of claim 2, further comprising receiving a label mapping message including data defining the label from the second routing device prior to sending the second packet to the second routing device.

4. The method of claim 1, wherein sending the second packet comprises:
   forming the data representative of the multicast join information from the multicast join information;
   forming the second packet to include the data representative of the multicast join information; and
   encapsulating the second packet with a label that indicates that the second packet includes the data representative of the multicast join information.

5. The method of claim 1, further comprising determining that the first packet comprises an Internet Group Management Protocol (IGMP) report, wherein updating the multicast state information of the first routing device comprises updating the multicast state information of the first routing device in response to the determination that the first packet comprises the IGMP report, and wherein sending the second packet comprises sending the second packet in response to the determination that the first packet comprises the IGMP report.

6. The method of claim 1, further comprising determining that the first packet comprises a Protocol Independent Multicast (PIM) packet, wherein updating the multicast state information of the first routing device comprises updating the multicast state information of the first routing device in response to the determination that the first packet comprises the PIM packet, and wherein sending the second packet comprises sending the second packet in response to the determination that the first packet comprises the PIM packet.

7. The method of claim 1, further comprising forwarding, by the first routing device, the first packet to a provider edge routing device of the EVPN along a path to a multicast source device corresponding to the multicast join information.

8. The method of claim 1, further comprising:
   receiving a third packet including multicast leave information corresponding to a multicast group of the multicast join information; and
   updating the multicast state information of the first routing device using the multicast leave information from the third packet.

9. The method of claim 8, wherein receiving the third packet comprises receiving the third packet from the CE routing device, the method further comprising sending a fourth packet including data representative of the multicast leave information to the second routing device to synchronize multicast state information of the second routing device with the multicast state information of the first routing device.

10. The method of claim 8, wherein receiving the third packet comprises receiving the third packet from the second routing device.

11. The method of claim 1, wherein the first routing device is configured as a non-designated forwarder (DF) routing device, the method further comprising, after updating the multicast state information of the first routing device:
   determining that the first routing device is to become a DF routing device; and
   based on the multicast state information and acting as the DF routing device, in response to receiving multicast traffic of the multicast group, preventing the multicast traffic from being sent to the CE routing device.

12. The method of claim 1, wherein the first routing device is configured as a non-designated forwarder (DF) routing device, the method further comprising:
   determining that the first routing device is to become a DF routing device; and
   based on the multicast state information and the determination that the first routing device is to become the DF routing device, in response to receiving multicast traffic of the multicast group, forwarding the multicast traffic to the CE routing device.

13. A first routing device of an Ethernet virtual private network (EVPN) that is multihomed to a customer edge (CE) routing device with a second routing device such that the CE routing device is communicatively coupled to both the first routing device and the second routing device via a common Ethernet segment, wherein the CE routing device forms part of a customer network, and wherein the first routing device and the second routing device form part of a service provider network separate from the customer network, the first routing device comprising:
   one or more network interfaces configured to send and receive packets; and
   one or more processors configured to:
      receive, via the one or more network interfaces, a first packet from the CE routing device including multicast join information;
      update multicast state information of the first routing device using the multicast join information from the first packet; and
      send, via the one or more network interfaces, a second packet including data representative of the multicast join information to the second routing device to synchronize multicast state information of the second routing device with the multicast state information of the first routing device.

14. The first routing device of claim 13, wherein the one or more processors are configured to encapsulate the first packet with a label to form the second packet, wherein the label indicates that the second packet includes the data representative of the multicast join information.

15. The first routing device of claim 13, wherein the one or more processors are further configured to:
   form the data representative of the multicast join information from the multicast join information;
   form the second packet to include the data representative of the multicast join information; and
   encapsulate the second packet with a label that indicates that the second packet includes the data representative of the multicast join information.

16. The first routing device of claim 13, wherein the first packet comprises one of an Internet Group Management Protocol (IGMP) report or a Protocol Independent Multicast (PIM) packet.

17. The first routing device of claim 13, wherein the one or more processors are further configured to:
   receive, via the one or more network interfaces, a third packet including multicast leave information corresponding to a multicast group of the multicast join information; and update the multicast state information of the first routing device using the multicast leave information from the third packet.

18. The first routing device of claim 17, wherein the one or more processors are configured to receive the third packet from the CE routing device via the one or more network interfaces, and wherein the one or more processors are further configured to send a fourth packet including data representative of the multicast leave information to the second routing device to synchronize multicast state information of the second routing device with the multicast state information of the first routing device.

19. The first routing device of claim 17, wherein the one or more processors are configured to receive the third packet from the second routing device via the one or more network interfaces.

20. The first routing device of claim 13, wherein the first routing device is configured as a non-designated forwarder (DF) routing device, and wherein the one or more processors are further configured to, after updating the multicast state information of the first routing device:
  determine that the first routing device is to become a DF routing device; and
  based on the multicast state information and acting as the DF routing device, in response to receiving multicast traffic of the multicast group, prevent the multicast traffic from being sent to the CE routing device.

21. The first routing device of claim 13, wherein the first routing device is configured as a non-designated forwarder (DF) routing device, and wherein the one or more processors are further configured to, after updating the multicast state information of the first routing device:
  determine that the first routing device is to become a DF routing device; and
  based on the multicast state information and the determination that the first routing device is to become the DF routing device, in response to receiving multicast traffic of the multicast group, forward the multicast traffic to the CE routing device.

22. A method comprising:
  receiving, by a first routing device of an Ethernet virtual private network (EVPN) that is multihomed to a customer edge (CE) routing device with a second routing device such that the CE routing device is communicatively coupled to both the first routing device and the second routing device via a common Ethernet segment, a packet from the second routing device including multicast join information for a client device communicatively coupled to the CE routing device, wherein the CE routing device forms part of a customer network, and wherein the first routing device and the second routing device form part of a service provider network separate from the customer network; and
  updating, by the first routing device, multicast state information of the first routing device using the multicast join information from the packet.

23. The method of claim 22, further comprising:
  receiving, by the first routing device, multicast traffic associated with the multicast join information; and
  forwarding, by the first routing device, the multicast traffic to the client device via the CE routing device based on the multicast state information.

24. The method of claim 22, further comprising:
  sending a label mapping message advertising a label to be used to indicate that a packet encapsulated with the label includes multicast state information to the second routing device prior to receiving the packet; and
  determining that the received packet is encapsulated with the label.

25. A first routing device of an Ethernet virtual private network (EVPN) that is multihomed to a customer edge (CE) routing device with a second routing device such that the CE routing device is communicatively coupled to both the first routing device and the second routing device via a common Ethernet segment, wherein the CE routing device forms part of a customer network, and wherein the first routing device and the second routing device form part of a service provider network separate from the customer network, the first routing device comprising:
  one or more network interfaces configured to send and receive packets; and
  one or more processors configured to:
    receive, via the one or more network interfaces, a packet from the second routing device including multicast join information for a client device communicatively coupled to the CE routing device; and
    update multicast state information of the first routing device using the multicast join information from the packet.

26. The first routing device of claim 25, wherein the one or more processors are further configured to:
  receive multicast traffic associated with the multicast join information; and
  forward the multicast traffic to the client device via the CE routing device based on the multicast state information.

27. The first routing device of claim 25, wherein the one or more processors are further configured to:
  send, via one of the network interfaces, a label mapping message advertising a label to be used to indicate that a packet encapsulated with the label includes multicast state information to the second routing device prior to receiving the packet; and
  determine that the received packet is encapsulated with the label.

28. A system comprising:
  a plurality of routing devices of an Ethernet virtual private network (EVPN) including a first routing device and a second routing device, wherein the first routing device and the second routing device are multihomed to a customer edge (CE) routing device such that the CE routing device is communicatively coupled to the first routing device and the second routing device via a common Ethernet segment, wherein the CE routing device forms part of a customer network, and wherein the plurality of routing devices form part of a service provider network separate from the customer network,
  wherein the first routing device is configured to:
    receive a first packet from the CE routing device including multicast join information;
    update multicast state information of the first routing device using the multicast join information from the first packet; and
    send a second packet including data representative of the multicast join information to the second routing device to synchronize multicast state information of the second routing device with the multicast state information of the first routing device, and
  wherein the second routing device is configured to:
    receive the second packet; and
    update the multicast state information of the second routing device using the data representative of the multicast join information.

* * * * *